United States Patent Office 3,542,738
Patented Nov. 24, 1970

3,542,738
ACCELERATION OF POLYESTER RESIN FORMATION USING A DIALKYL OXYDIFORMATE AND PRODUCT
Mary J. Stewart, Riddlewood, Media, and John A. Price, Swarthmore, Pa., assignors to FMC Corporation, Philadelphia, Pa., a corporation of Delaware
No Drawing. Filed July 15, 1968, Ser. No. 744,663
Int. Cl. C08g 17/08, 17/13
U.S. Cl. 260—75
10 Claims

ABSTRACT OF THE DISCLOSURE

A method of accelerating the preparation of filament- or film-forming thermoplastic polyester resin, comprising reacting dimethyl terephthalate and an alkylene glycol in the presence of a dialkyl oxydiformate, and the product prepared by this method, is disclosed herein.

---

A principal method for the preparation of filament- or film-forming thermoplastic polyester resin such as polyethylene terephthalate, is by first reacting an alkanol ester of the diacid with a diol to effect an ester-interchange reaction and then polycondensing the ester-interchange reaction product.

From a commercial standpoint, it is essential that the polyester resin be produced in the shortest possible time and have a high molecular weight, good color, a low carboxyl content, a low diethylene glycol content and a high melting point. For example, a polyethylene terephthalate resin suitable for melt spinning into shaped articles should have substantially little color, an intrinsic viscosity preferably not less than about 0.60 (determined in a solution of 60 wt. percent phenol and 40 wt. percent tetrachloroethane at 30° C.), a carboxyl content of no more than about 50 equivalents per million grams (meq./kg.), a diethylene glycol content of no more than about 1.5 wt. percent, and a birefringent melting point of at least about 255° C., in order for the products formed therefrom to possess a satisfactory level of hydrolytic stability thermal stability, ultra-violet light stability, and high strength.

It is an object of this invention to provide a method for the preparation of filament- or film-forming thermoplastic polyester resins by the ester-interchange route which will accelerate the preparation and produce higher quality products.

It is another object of this invention to provide novel filament- or film-forming thermoplastic polyester resin having excellent properties suitable for the manufacture of shaped articles.

These and other objects are accomplished in accordance with this invention, which is a method of preparing filament- or film-forming thermoplastic polyester resin which comprises reacting dimethyl terephthalate with an alkylene glycol having from 2 to 10 carbon atoms under ester-interchange conditions in the presence of an ester-interchange catalyst and a dialkyl oxydiformate having from 1 to 4 carbon atoms in the alkyl group, and polycondensing the ester-interchange reaction product, said dialkyl oxydiformate being present in an amount sufficient to accelerate the preparation of said resin.

Alkylene glycols which are useful for this invention include for example, ethylene glycol, tetramethylene glycol, hexamethylene glycol, octamethylene glycol and decamethylene glycol. Because of its availability, low cost and ease with which polyesters are prepared therefrom, ethylene glycol is preferred. The glycol is generally employed in the reaction at a glycol to ester ratio of from about 1:1 to about 15:1, preferably from about 1.2:1 to about 2.6:1.

Ester-interchange catalysts are a well-known class of catalytic materials and include, for example, lithium hydride, lithium hydroxide, lithium amide, zinc acetate, manganese acetate, alkali metal carbonates, and the like. The catalyst is generally employed in an amount ranging from about 0.01 to about 0.2%, based on the weight of the dimethyl terephthalate in the initial reaction mixture.

The dialkyl oxydiformate of this invention has the following general formula:

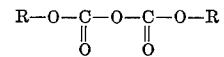

wherein R is an alkyl group having from 1 to 4 carbon atoms. The preferred compound, based on availability, is diethyl oxydiformate. The above compound is generally useful in the process of this invention in amounts ranging from about 0.25 to about 10%, preferably from about 1 to about 5%, based on the total moles of diester compounds present in the original reaction mixture. The dialkyl oxydiformate will accelerate the ester-interchange and the polycondensation reaction. However, when a particularly rapid ester-interchange catalyst is employed, the acceleration will be more evident in the polycondensation stage. This acceleration may be brought about because the dialkyl oxydiformate enters into the reaction and a filament- or film-forming thermoplastic alkylene terephthalate copolyester is formed containing up to about 10 mol percent of randomly recurring structural units having the following general formula:

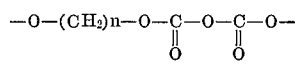

wherein $n$ is from 2 to 10, depending on the number of carbon atoms in the alkylene glycol used in the ester-interchange reaction.

Ester-interchange conditions, as referred to in the process of this invention, are conventional and generally involve initial reaction mixtures of the aliphatic glycol and dimethyl terephthalate at a mol ratio of from about 1:1 to 15:1, preferably from about 1.2:1 to about 2.6:1. The reaction can be carried out at atmospheric pressure in an inert atmosphere, e.g. nitrogen, initially at a temperature range of from about 125 to about 250° C., but preferably between about 150 and 200° C., in the presence of an ester-interchange catalyst and the dialkyl oxydiformate. During this stage of the reaction, methanol is evolved and is continuously removed by distillation. After a reaction period of about 1 to 2 hours, the temperature of the reaction is raised to from about 200 to about 300° C. and the reaction continued at this temperature for from about 1 to 3 hours to complete the reaction and form the ester-interchange product.

If a polycondensation catalyst has not been added before or during the first stage reaction, the product is generally cooled under nitrogen and, if desired, any polycondensation catalyst added, e.g. antimony compounds, in an amount ranging from about 0.01 to about 0.2%, based on the weight of the ester-interchange product. The product is then placed under reduced pressure of from about 0.5 to 20 mm. of mercury and heated to a range of about 260 to about 325° C. while agitating. The polycondensation reaction proceeds for about 1 to 4 hours, and the product is then cooled under nitrogen or other inert gas.

The following examples are set forth to demonstrate this invention:

EXAMPLE I

A mixture comprising 297.4 g. of dimethyl terephthalate, 198 mls. of ethylene glycol, 2.5 g. of diethyl oxydiformate (1.0 mol percent, based on total diester content), and 0.12 g. of lithium amide, an ester-interchange catalyst, was charged to a reaction vessel equipped with a nitrogen inlet, heating means and stirring means. The reaction mixture was agitated and heated at atmospheric pressure to 197° C. under a nitrogen atmosphere. The reaction mixture was held at the above temperature for about 2 hours during which time a small proportion of ethanol and about 80% of the methanol by-product was removed. The temperature of the reaction mixture was then allowed to rise to 230° C. over a period of about 1 hour to distill off the remaining methanol by-product and a small portion of the excess ethylene glycol, and form a polyester prepolymer product. The prepolymer was allowed to cool under an atmosphere of nitrogen.

50 grams of the above prepolymer product was mixed with 0.02 g. of antimony oxalate in a reaction vessel and heated to about 280° C. under reduced pressure of about 0.1 mm. of mercury for 2 hours with constant stirring to bring about the formation of a high molecular weight polyester resin. The product was then cooled under a nitrogen atmosphere.

The above reaction, using the identical conditions and component amounts, was repeated several times, except that the amount of diethyl oxydiformate was varied. The following table shows properties of the resins produced in this manner:

TABLE I

| DEODF [1], mol percent: | First stage[2] half-time, min. | Intrinsic viscosity | Diethylene glycol content, weight percent | Carboxyl content meq./kg. | Melting point ° C. |
|---|---|---|---|---|---|
| 0 | 21 | 0.682 | 0.48 | 11 | 255 |
| 1 | 6 | 0.841 | 0.39 | 10 | 255 |
| 5 | 6 | 0.806 | 0.60 | 9 | 261 |
| 10 | 7 | 0.855 | 0.42 | 11 | 252 |

[1] Diethyl oxydiformate.
[2] Time necessary for the first one-half of the theoretical amount of methanol that is produced during the ester-interchange reaction to distill off.

It is seen from the above table that small percentages of the dialkyl oxydiformate in the reaction mixture appreciably speed the reaction and produce polymer of higher molecular weight. As the amount of this compound in the reaction is put above 10 mol percent, based on total diester content in the mixture, the melting point begins to fall off.

As a further example of the effect of the dialkyl oxydiformate on ester-interchange reactions, terephthalate polyester resins were prepared in a manner similar to the above described reactions, except that the reaction mixtures were not agitated during the polycondensation step and the reduced pressure was maintained for 4 hours, instead of 2 hours.

The following table sets forth the results of these procedures:

TABLE II

| DEODF [1], mol percent: | First stage half-time, min. | Intrinsic viscosity | Diethylene glycol content, weight percent | Carboxyl content meq./kg. | Melting point ° C. |
|---|---|---|---|---|---|
| 0 | 19 | 0.507 | 0.65 | 27 | 255 |
| 1 | 8 | 0.598 | 0.60 | 25 | 259 |
| 3 | 5 | 0.714 | 0.86 | 20 | 258 |
| 5 | 5 | 0.880 | 0.92 | 17 | 256 |
| 25 | 9 | 0.630 | 6.81 | 36 | 229 |

[1] Diethyl oxydiformate.

Again it is seen that the dialkyl oxydiformate improves the reaction rate and the molecular weight without adversely effecting other polymer properties when used in the specified amounts. Higher amounts, above 10 mol percent, appear to degrade polymer properties.

EXAMPLE II

To demonstrate the effectiveness of the dialkyl oxydiformate with other first stage, i.e., ester-interchange, catalysts, several runs were made using the conditions set forth in Example I for ester-interchange, except that a different first stage catalyst was employed at a concentration of 0.04%, based on the weight of the dimethyl terephthalate. The polycondensation was carried out without stirring under reduced pressure of about 0.1 mm. of mercury for 4 hours in the presence of antimony oxalate as in Example I.

The results of these reaction runs are set forth in the following table:

TABLE III

| First stage catalyst | DEODF [1] mol percent | First stage half-time, min. | Intrinsic viscosity | Diethylene Glycol, Wt. percent | Carboxyl Content meq./kg. | Melting point ° C. |
|---|---|---|---|---|---|---|
| LiOH.H₂O | 0 | 5 | .514 | .37 | 25 | 260 |
| LiOH.H₂O | 3 | 5 | .825 | .67 | 16 | 262 |
| Na₂CO₃ | 0 | 11 | .365 | .28 | 20 | 262 |
| Na₂CO₃ | 3 | 6 | .697 | .57 | 22 | 265 |

[1] Diethyl oxydiformate.

It is evident from the above table that the dialkyl oxydiformate accelerates the reaction rate either in the ester-interchange stage or in the polycondensation stage. Lithium hydroxide is in itself a fast catalyst; however, the incorporation of the dialkyl oxydiformate in the first stage improves the properties of the polymer during the polycondensation stage as compared with the run using lithium hydroxide catalyst and no dialkyl oxydiformate.

It has been found that the incorporation of the dialkyl oxydiformate, after the ester-interchange reaction, into the reaction mixture prior to polycondensation, produces no useful results. The dialkyl oxydiformate must be incorporated in the ester-interchange stage, so that it will itself enter in to the ester-interchange reaction and then become a part of the polymer chain during polycondensation.

It is known that the diethyl oxydiformate enters the interchange reaction since the refractive indices of the distillate from the reaction was measured periodically and indicated the presence of a small proportion of ethanol in the first portion of the distillate.

The resulting copolyester resin has improved physical properties over those homopolymers produced in the same manner without the incorporation of the dialkyl oxydiformate.

Various changes and modifications may be made practicing this invention without departing from the spirit and scope thereof, and therefore, it is not to be limited, except as defined in the appended claims.

We claim:
1. A method of preparing filament- or film-forming thermoplastic polyester resin which comprises reacting dimethyl terephthalate with an alkylene glycol having from 2 to 10 carbon atoms under ester-interchange conditions in the presence of an ester-interchange catalyst and a dialkyl oxydiformate wherein the alkyl group has from 1 to 4 carbon atoms, and polycondensing the ester-interchange reaction product, said dialkyl oxydiformate being present in an amount sufficient to accelerate the preparation of said resin.

2. The method of claim 1 wherein the dialkyl oxydiformate is employed in an amount ranging from about 0.25 to about 10%, based on the total moles of diester compounds present.

3. The method of claim 1 wherein the ester-interchange catalyst is lithium amide.

4. The method of claim 1 wherein the ester-interchange catalyst is lithium hydroxide.

5. The method of claim 1 wherein the ester-interchange catalyst is sodium carbonate.

6. The method of claim 1 wherein the ester-interchange reaction product is polycondensed in the presence of a catalytic amount of an antimony compound.

7. The method of claim 6 wherein the antimony compound is antimony oxalate.

8. An alkylene terephthalate copolymer resin having from 2 to 10 carbon atoms in the alkylene radical and containing up to 10 mol percent of randomly recurring structural units having the following general formula:

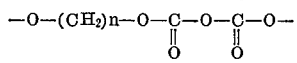

wherein $n$ is a number corresponding to the number of carbon atoms in said alkylene radical.

9. The alkylene terephthalate copolymer of claim 8 having 2 carbon atoms in the alkylene radical.

10. The alkylene terephthalate of claim 9 containing from about 1 to about 5 mol percent of said randomly recurring structural units.

References Cited
UNITED STATES PATENTS 3,200,097   8/1965   Windholz _____ 260—75

FOREIGN PATENTS 1,047,419   12/1958   Germany.

HAROLD D. ANDERSON, Primary Examiner

LOUISE P. QUAST, Assistant Examiner

U.S. Cl. X.R.

260—77.5